(12) United States Patent
Kim

(10) Patent No.: US 11,507,339 B2
(45) Date of Patent: Nov. 22, 2022

(54) IMAGE DISPLAY APPARATUS, SERVER AND SYSTEM INCLUDING THE SAME

(71) Applicant: LG ELECTRONICS INC., Seoul (KR)

(72) Inventor: Hyorim Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 59 days.

(21) Appl. No.: 17/094,648

(22) Filed: Nov. 10, 2020

(65) Prior Publication Data

US 2021/0141591 A1    May 13, 2021

(51) Int. Cl.
*G06F 3/16* (2006.01)
*H04N 5/04* (2006.01)
*H04W 4/80* (2018.01)

(52) U.S. Cl.
CPC .............. *G06F 3/165* (2013.01); *G06F 3/162* (2013.01); *H04N 5/04* (2013.01); *H04W 4/80* (2018.02)

(58) Field of Classification Search
CPC .......... G06F 3/165; G06F 3/162; H04N 5/04; H04N 21/4307; H04N 21/43637; H04W 4/80
USPC ........................................................ 348/515
See application file for complete search history.

(56) References Cited

U.S. PATENT DOCUMENTS

| | | | |
|---|---|---|---|
| 10,080,061 B1 * | 9/2018 | Kirley | H04N 21/4394 |
| 2009/0135856 A1 * | 5/2009 | Gha | H04N 21/44004 370/503 |
| 2014/0185520 A1 * | 7/2014 | Gao | G01S 5/021 370/328 |
| 2014/0376873 A1 * | 12/2014 | Tanaka | H04N 21/47 386/203 |
| 2017/0223615 A1 * | 8/2017 | Lee | H04W 48/14 |
| 2019/0007725 A1 * | 1/2019 | Ferrer | H04N 21/25891 |

(Continued)

FOREIGN PATENT DOCUMENTS

| | | |
|---|---|---|
| JP | 2010152153 | 7/2010 |
| JP | 2017122781 | 7/2017 |
| JP | 2019012964 | 1/2019 |

(Continued)

OTHER PUBLICATIONS

PCT International Application No. PCT/KR2019/015474, International Search Report dated Aug. 6, 3 pages.

(Continued)

*Primary Examiner* — John W Miller
*Assistant Examiner* — Sean N. Haiem
(74) *Attorney, Agent, or Firm* — Lee, Hong, Degerman, Kang & Waimey PC

(57) ABSTRACT

The present disclosure relates to an image display apparatus, a server, and an image display system including the same. The image display apparatus according to an embodiment of the present disclosure includes: a display; an external device interface unit having at least one communication module and performing short-range communication; and a controller, wherein the controller receives a data packet from an external audio device through the external device interface unit, and determines a time point at which image is output through the display, based on a delay value included in the data packet, when the data packet includes the delay value for a delay of audio output.

9 Claims, 8 Drawing Sheets

(56) References Cited

U.S. PATENT DOCUMENTS

2019/0090028 A1* 3/2019 Kirley .............. H04N 21/43615
2021/0359905 A1* 11/2021 Zu ....................... H04L 41/0893

FOREIGN PATENT DOCUMENTS

KR       101450100     10/2014
KR    1020190056060     5/2019

OTHER PUBLICATIONS

Intellectual Property Office of India Application Serial No. 202034049125, Office Action dated Jul. 14, 2021, 5 page.

\* cited by examiner

IMAGE DISPLAY APPARATUS, SERVER AND SYSTEM INCLUDING THE SAME

CROSS-REFERENCE TO RELATED APPLICATION

Pursuant to 35 U.S.C. § 119, this application claims the benefit of an earlier filing date and right of priority to International Application No. PCT/KR2019/015474, filed on Nov. 13, 2019, the contents of which are hereby incorporated by reference herein in its entirety.

BACKGROUND OF THE INVENTION

1. Field of the Invention

The present disclosure relates to an image display apparatus, a server, and an image display system including the same.

2. Description of the Related Art

An image display apparatus is an apparatus having a function of displaying an image that can be viewed by a user.

For example, the image display apparatus may include a Television TV having a liquid crystal display LCD using liquid crystal or an OLED display using an organic light emitting diode OLED.

Such an image display apparatus may transmit/receive data to and from various electronic devices by wire or wirelessly. For example, the image display apparatus may perform communication connection with an external audio device through a Bluetooth method which is one of short-range communication method.

In addition, recent image display system allows an external audio device to output audio corresponding to an image while displaying the image through the image display apparatus, thereby providing a surround sound so that user can watch the image while simultaneously enjoying the audio transmitted from various directions.

Meanwhile, when the image display apparatus transmits and receives audio signals to and from an external audio device, there exist a time required for transmitting and receiving an audio signal, a time required for processing an audio signal, etc., and thus, there is a problem in that a difference between a time point at which image/audio is output and a time point at which audio is output from an external audio device, i.e., a delay occurs in the audio output from an external audio device.

In addition, depending on the type and performance of the external audio device, the degree of audio output delay is different, so even if the image display apparatus adjusts an audio output delay according to a preset adjustment value, there is a problem in that it is difficult to control the output delay with respect to all of various types of external audio devices.

SUMMARY OF THE INVENTION

The present disclosure has been made in view of the above problems, and provides an image display apparatus, a server, and an image display system including the same that can effectively adjust a difference between a time point at which an image/audio is output from an image display apparatus and a time point at which an audio is output from an external audio device.

In accordance with an aspect of the present disclosure, an image display apparatus includes: a display; an external device interface unit having at least one communication module and performing short-range communication; and a controller, wherein the controller receives a data packet from an external audio device through the external device interface unit, and determines a time point at which image is output through the display, based on a delay value included in the data packet, when the data packet includes the delay value for a delay of audio output.

In accordance with another aspect of the present disclosure, a server includes: a communication unit including at least one communication module and performing communication; a memory; and a controller, wherein the controller receives an identifier of an audio device and a delay value for a delay of audio output, from at least one external device, through the communication unit, maps the delay value to the identifier and stores in the memory, and determines a reference delay value for a identifier to which a certain number or more of delay values are mapped, among at least one identifier stored in the memory.

In accordance with another aspect of the present disclosure, an image display system includes: an image display apparatus and an external audio device, wherein the external audio device transmits a data packet including an identifier to the image display apparatus, and the image display apparatus determines a time point at which an image is output through a display, based on a delay value included in the data packet, when the delay value for a delay of audio output is included in the data packet.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Figure 1:
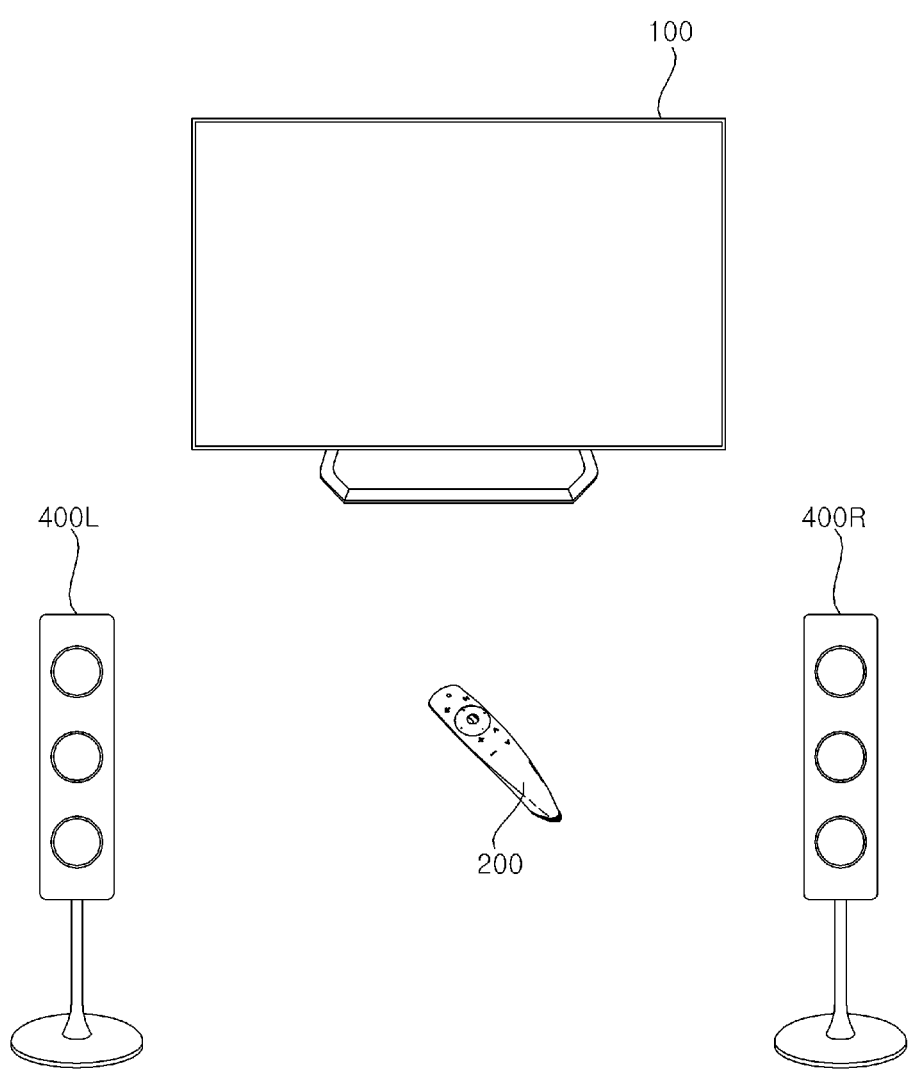
FIG. 1 is a diagram illustrating an image display system according to an embodiment of the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components.

Terms "module" and "part" for elements used in the following description are given simply in view of the ease of the description, and do not carry any important meaning or role. Therefore, the "module" and the "part" may be used interchangeably.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

Unless otherwise defined, all terms including technical and scientific terms used herein have the same meaning as commonly understood by one of ordinary skill in the art to which the present disclosure belongs. Further, terms defined in a common dictionary will not be interpreted in an idealized or overly formal sense unless expressly so defined herein.

In the drawings, the thicknesses or the sizes of elements and graphs may be exaggerated, omitted or simplified to more clearly and conveniently illustrate the present disclosure.

FIG. 1 is a diagram illustrating an image display system according to an embodiment of the present disclosure.

Referring to FIG. 1, an image display system 10 may include an image display device 100, a remote control device 200 and/or an external audio device 400L and 400R.

The image display device 100 may be an apparatus that processes and outputs an image. The image display device 100 is not particularly limited such as a TV, a notebook computer, a monitor, and the like as long as it can output a screen corresponding to an image signal.

The image display device 100 may receive a broadcast signal, signal-process the broadcast signal, and output a signal-processed broadcast image. When the image display device 100 receives a broadcast signal, the image display device 100 may correspond to a broadcast reception device.

The image display device 100 may receive a broadcast signal wirelessly through an antenna, or may receive a broadcast signal by wire through a cable.

For example, the image display device 100 may receive a terrestrial broadcast signal, a satellite broadcast signal, a cable broadcast signal, an Internet Protocol Television (IPTV) broadcast signal, and the like.

The remote control device 200 may be connected to the image display device 100 by wire and/or wirelessly to provide various control signals to the image display device 100. At this time, the remote control device 200 may include a device that establishes a wired or wireless network with the image display device 100 and transmits various control signals to the image display device 100 through the established network, or receives a signal related to various operations processed by the image display device 100 from the image display device 100.

For example, various input devices, such as a mouse, a keyboard, a space remote controller, a trackball, a joystick, and the like may be used as the remote control device 200. The remote control device 200 may be referred to as an external device, and hereinafter, it should be noted that an external device and a remote control device can be mixed and used, if necessary.

The image display device 100 may be connected to only a single remote control device 200, or connected to two or more remote control devices 200 at the same time, and may change the object displayed on a screen or adjust the state of the screen, based on a control signal provided from each remote control device 200.

The image display device 100 and the external audio device 400L and 400R may mutually wirelessly transmit and receive signals including data. For example, the image display device 100 and the external audio device 400L and 400R may mutually perform pairing to establish a communication channel, and transmit and receive data through a communication channel.

The external audio device 400L and 400R may output audio. For example, the external audio device 400L and 400R may output audio, based on the audio signal received from the image display device 100.

In the drawing, two external audio devices 400L and 400R are illustrated, but the present disclosure is not limited thereto, and the image display system 10 may include one or three or more external audio devices.

For example, when the image display system 10 includes two external audio devices 400L and 400R, each of the external audio devices 400L and 400R may communicate with the image display device 100. Alternatively, any one of the external audio devices 400L and 400R (e.g. a first audio device 400L) may communicate with the image display device 100, and transmit data received from the image display device 100 to the other (e.g. a second audio device 400R).

Meanwhile, the image display system 10 may further include a server (not shown).

The image display device 100 may perform communication with a server, and transmit and receive data mutually.

For example, the image display device 100 may update a program or database stored in the image display device 100, based on data received from the server.

Figure 2:
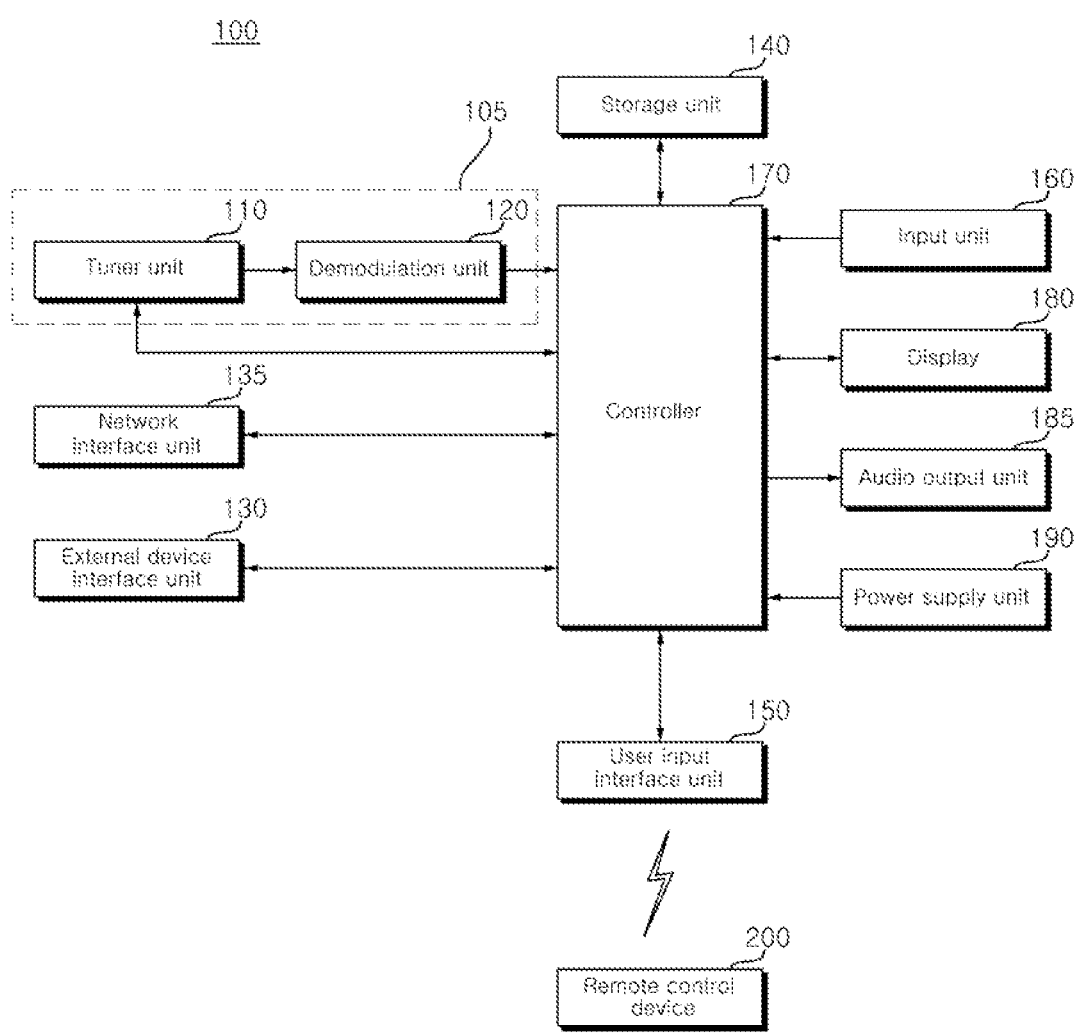
FIG. 2 is an internal block diagram of the image display apparatus of FIG. 1.

FIG. 2 is an internal block diagram of the image display apparatus of FIG. 1.

Referring to FIG. 2, the image display device 100 may include a broadcast reception unit 105, an external device interface unit 130, a network interface unit 135, a storage unit 140, a user input interface unit 150, an input unit 160, a controller 170, a display 180, an audio output unit 185 and/or a power supply unit 190.

The broadcast reception unit 105 may include a tuner unit 110 and a demodulation unit 120.

Meanwhile, unlike the drawing, it is also possible that the image display device 100 includes only the broadcast reception unit 105, and the external device interface unit 130, among the broadcast reception unit 105, the external device interface unit 130, and the network interface unit 135. That is, the image display device 100 may not include the network interface unit 135.

The tuner 110 may select a broadcast signal corresponding to a channel selected by a user or all previously stored channels from among broadcast signals received through an antenna (not shown) or a cable (not shown). The tuner 110 may convert the selected broadcast signal into an intermediate frequency signal, a baseband image, or an audio signal.

For example, if the selected broadcast signal is a digital broadcast signal, the tuner 110 may convert the digital broadcast signal into a digital IF signal (DIF). If the selected broadcast signal is an analog broadcast signal, the tuner 110 may convert the analog broadcast signal into an analog baseband image or audio signal (CVBS/SIF). That is, the tuner unit 110 may process a digital broadcast signal or an analog broadcast signal. The analog baseband image or audio signal (CVBS/SIF) output from the tuner 110 may be directly input to the controller 170.

Meanwhile, the tuner 110 may sequentially select broadcast signals of all broadcast channels stored through a channel memory function among received broadcast signals, and convert the broadcast signals into an intermediate frequency signal, a baseband image, or an audio signal.

Meanwhile, the tuner unit 110 may include a plurality of tuners in order to receive broadcast signals of a plurality of channels. Alternatively, a single tuner that simultaneously receives broadcast signals of multiple channels may be provided.

A demodulation unit 120 may perform a demodulation operation by receiving the digital IF signal DIF converted by the tuner unit 110.

The demodulation unit 120 may output a stream signal TS after performing demodulation and channel decoding. In this case, the stream signal may be a signal which is obtained by multiplexing an image signal, an audio signal, or a data signal.

The stream signal output from the demodulation unit 120 may be input to the controller 170. After performing demultiplexing, image/audio signal processing, and the like, the controller 170 may output an image through the display 180 and output an audio through the audio output unit 185.

The external device interface unit 130 may transmit or receive data with a connected external device. To this end, the external device interface unit 130 may include an A/V input/output unit (not shown).

The external device interface unit 130 may be connected to an external device such as a digital versatile disk (DVD), a Blu ray, a game device, a camera, a camcorder, a computer (laptop), a set-top box, or the like by wire/wireless, and may perform input/output operations with the external device.

In addition, the external device interface unit 130 communicates with various remote control device 200 as shown in FIG. 1, and may receive a control signal related to the operation of the image display device 100 from the remote control device 200, or may transmit data related to the operation of the image display device 100 to the remote control device 200.

In addition, the external device interface unit 130 may establish a communication channel with the external audio device 400L and 400R to mutually transmit and receive data.

An A/V input/output unit may receive image and audio signals from an external device.

The external device interface unit 130 may include a wireless communication unit (not shown) for short-range wireless communication with other electronic device.

Through such a wireless communication unit (not shown), the external device interface unit 130 may exchange data with an adjacent mobile terminal. In particular, in a screen mirroring mode, the external device interface unit 130 may receive device information, executed application information, application images, and the like from the mobile terminal.

The network interface unit 135 may provide an interface for connecting the image display device 100 to a wired/wireless network including an Internet network.

For example, the network interface unit 135 may communicate with a relay device, i.e., an access point AP by wire or wirelessly to access a local network through the access point AP, or access a server by using the Internet.

The network interface unit 135 may receive content or data provided by the Internet, a content provider, or a network operator through a network.

Meanwhile, the network interface unit 135 may include a communication module (not shown) for connection with a wired/wireless network.

The external device interface unit 130 and/or the network interface unit 135 may include a communication module for short-range communication such as Wireless Fidelity (Wi-Fi), Bluetooth, Bluetooth Low Energy (BLE), Zigbee, and Near Field Communication (NFC), and a communication module for cellular communication such as long-term evolution (LTE), LTE Advance (LTE-A), code division multiple access (CDMA), wideband CDMA (WCDMA), universal mobile telecommunications system (UMTS), Wireless Broadband (WiBro).

The storage unit 140 may store a program for processing and controlling each signal in the controller 170 or may store a signal-processed image, audio, or data signal.

For example, the storage unit 140 may store application programs designed for performing various tasks that can be processed by the controller 170, and may provide some of the stored application programs selectively when requested by the controller 170.

Program, or the like stored in the storage unit 140 is not particularly limited as long as they can be executed by the controller 170.

The storage unit 140 may perform a function for temporary storage of an image, audio, or data signal received from an external device through the external device interface unit 130.

The storage unit 140 may store a database. For example, the storage unit 140 may store a database related to a delay value for delay of audio output. Here, the delay value for the delay of the audio output may mean a value for a difference between a time when the image/audio is output from the image display device 100 and a time when the audio is output from the external audio device (e.g. 400L, 400R).

Meanwhile, the database stored in the storage unit 140 may be updated based on data transmitted from an external device (e.g. external audio device 400L, 400R) through the external device interface unit 130 and/or data transmitted from a server (not shown).

The storage unit 140 may store information on a certain broadcast channel, through a channel storage function such as a channel map.

FIG. 2 illustrates an embodiment in which the storage unit 140 is provided separately from the controller 170, but the scope of the present disclosure is not limited thereto, and the storage unit 140 may be included in the controller 170.

The storage unit 140 may include at least one of volatile memory (e.g. DRAM, SRAM, SDRAM, etc.), and nonvolatile memory (e.g. flash memory, hard disk drive HDD, and solid-state drive SSD, etc.).

The user input interface unit 150 may transmit a signal input by the user to the controller 170, or may transmit a signal from the controller 170 to the user.

For example, the user input interface unit 150 may transmit/receive a user input signal such as power on/off, channel selection, and screen setting from the remote control device 200, transmit a user input signal input from a local key (not shown) such as a power key, a channel key, a volume key, and a setting key to the controller 170, transmit a user input signal input from a sensor unit (not shown) that senses a user's gesture to the controller 170, or transmit a signal from the controller 170 to a sensor unit.

The input unit 160 may be provided in one side of the main body of the image display device 100. For example, the input unit 160 may include a touch pad, a physical button, or the like.

The input unit 160 may receive various user commands related to the operation of the image display device 100, and may transmit a control signal corresponding to the input command to the controller 170.

The controller 170 may include at least one processor, and may control the overall operation of the image display device 100 by using the processor included therein. Here, the processor may be a general processor such as a central processing unit (CPU). Obviously, the processor may be a dedicated device such as an ASIC or another hardware-based processor.

The controller 170 may demultiplex the stream input through the tuner unit 110, the demodulation unit 120, the external device interface unit 130, or the network interface unit 135, or may generate and output a signal for image or audio output by processing demultiplexed signals.

The display 180 may generate a driving signal by converting the data signal, the OSD signal, the control signal, the image signal processed by the controller 170, or the data signal, the control signal, the image signal received from the external device interface unit 130, or the like.

The display 180 may include a display panel (not shown) including a plurality of pixels.

A plurality of pixels provided in a display panel may include a RGB subpixel. Alternatively, a plurality of pixels included in a display panel may include a RGBW subpixel. The display 180 may generate a driving signal for a plurality of pixels, by converting the image signal, the data signal, the OSD signal, the control signal, and the like processed by the controller 170.

The display 180 may be a Plasma Display Panel (PDP), a Liquid Crystal Display (LCD), an Organic Light Emitting Diode (OLED), a flexible display, or the like and may also be a 3D display. The 3D display 180 may be classified into a glasses-free type and a glasses type.

Meanwhile, the display 180 may be configured as a touch screen and used as an input device in addition to an output device.

The audio output unit 185 receives an audio-processed signal from the controller 170 and outputs as an audio.

The image signal image-processed by the controller 170 may be input to the display 180 and displayed as an image corresponding to a pertinent image signal. In addition, the image signal image-processed by the controller 170 may be input to an external output device through the external device interface unit 130.

The audio signal processed by the controller 170 may be output as an audio to the audio output unit 185. In addition, the audio signal processed by the controller 170 may be transmitted to an external output device (e.g. external audio device 400L and 400R) through the external device interface unit 130.

Although not shown in FIG. 2, the controller 170 may include a demultiplexer, an image processing unit, and the like. This will be described later with reference to FIG. 3.

In addition, the controller 170 may control the overall operation of the image display device 100.

For example, the controller 170 may control the tuner unit 110 to select (tune) a channel selected by a user or a broadcast corresponding to a previously stored channel.

In addition, the controller 170 may control the image display device 100 according to a user command input through the user input interface unit 150 or an internal program.

Meanwhile, the controller 170 may control the display 180 to display an image. In this case, the image displayed on the display 180 may be a still image or a moving image, and may be a 2D image or a 3D image.

Meanwhile, the controller 170 may display a certain 2D object within an image displayed on the display 180. For example, the object may be at least one of an accessed web screen (newspaper, magazine, etc.), an electronic program guide (EPG), various menus, widget, icon, still image, moving image, and text.

Meanwhile, the image display device 100 may further include a photographing unit (not shown). The photographing unit may photograph a user. The photographing unit may be implemented with one camera, but is not limited thereto, and may be implemented with a plurality of cameras. Meanwhile, the photographing unit may be embedded in the image display device 100 on the display 180 or may be separately disposed. Image information photographed by the photographing unit may be input to the controller 170.

The controller 170 may recognize a user's location, based on the image photographed by the photographing unit. For example, the controller 170 may determine a distance (z-axis coordinate) between the user and the image display device 100. In addition, the controller 170 may determine the x-axis coordinates and the y-axis coordinates in the display 180 corresponding to the user location.

The controller 170 may detect a user's gesture based on the image photographed by the photographing unit, or each of signals detected by the sensor unit or a combination thereof.

The power supply unit 190 may supply corresponding power throughout the image display device 100. In particular, the power supply unit 190 may supply power to the controller 170 that can be implemented in the form of a System On Chip (SOC), the display 180 for displaying an image, the audio output unit 185 for outputting audio, and the like.

Specifically, the power supply unit 190 may include a converter (not shown) for converting AC power into DC power, and a DC/Dc converter (not shown) for converting the level of DC power.

The remote control device 200 may transmit a user input to the user input interface unit 150. To this end, the remote control device 200 may use Bluetooth, Radio Frequency (RF) communication, Infrared Radiation communication, Ultra-wideband (UWB), ZigBee, and the like. In addition, the remote control device 200 may receive an image, audio, or data signal output from the user input interface unit 150, and display it on the remote control device 200 or output as an audio.

Meanwhile, the above-described image display device 100 may be a digital broadcast receiver capable of receiving a fixed or mobile digital broadcast.

Meanwhile, the block diagram of the image display device 100 shown in FIG. 2 is just a block diagram for an embodiment of the present disclosure, and each component of the block diagram can be combined, added, or omitted in accordance with the specifications of the image display device 100 that is actually implemented.

That is, if necessary, two or more components may be combined into a single component, or one component may be subdivided into two or more components. In addition, the functions performed in each block are for explaining the embodiment of the present disclosure, and a specific operation or device thereof does not limit the scope of the present disclosure.

Figure 3:
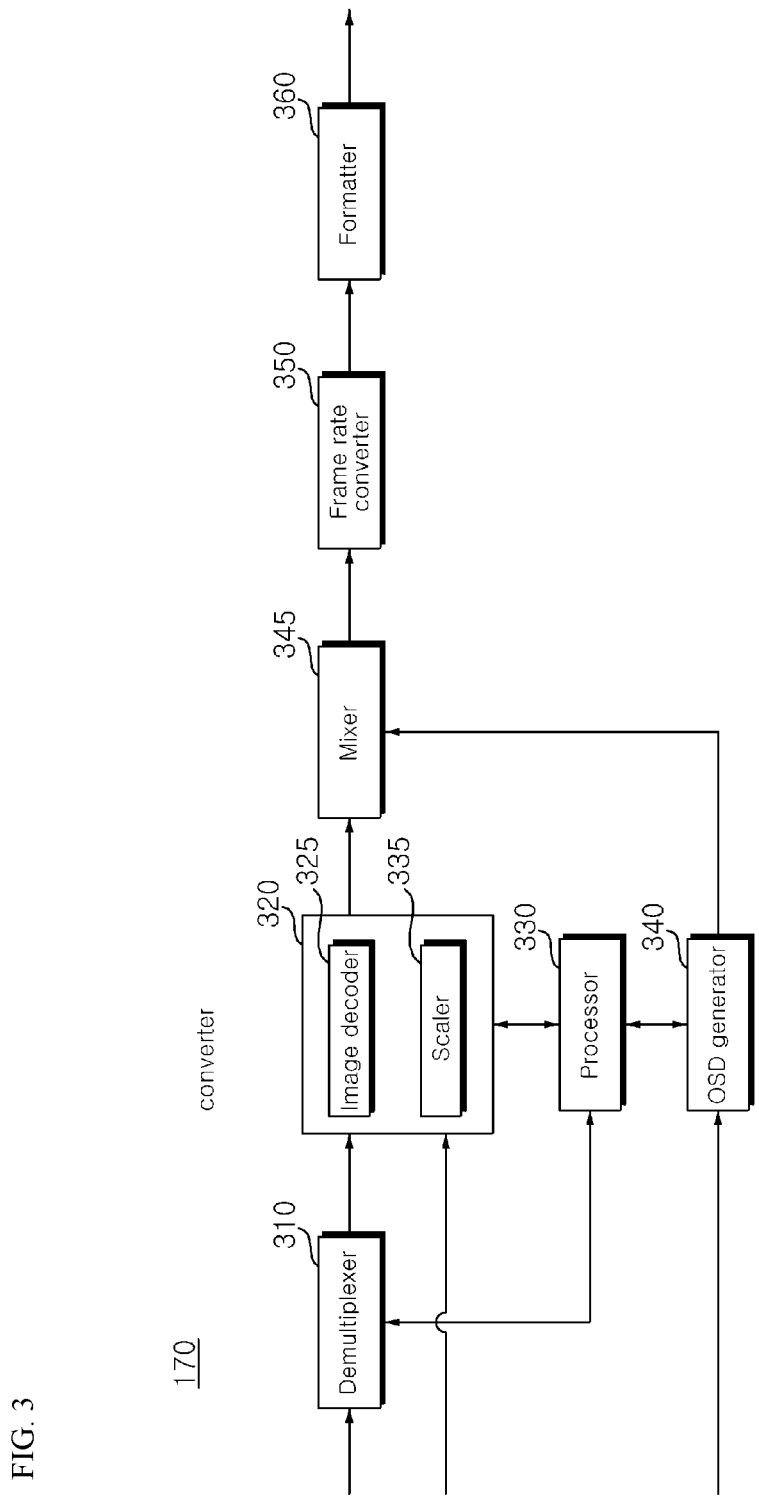
FIG. 3 is an internal block diagram of a controller of FIG. 2.

FIG. 3 is an internal block diagram of a controller of FIG. 2.

Referring to FIG. 3, the controller 170 according to an embodiment of the present disclosure may include a demultiplexer 310, an image processing unit 320, a processor 330, an OSD generator 340, a mixer 345, a frame rate converter 350, and/or a formatter 360. In addition, an audio processing unit (not shown) and a data processing unit (not shown) may be further included.

The demultiplexer 310 may demultiplex an input stream. For example, when an MPEG-2 TS is input, it can be demultiplexed and separated into image, audio, and data signal, respectively. Here, the stream signal input to the demultiplexer 310 may be a stream signal output from the tuner unit 110, the demodulation unit 120, or the external device interface unit 130.

The image processing unit 320 may perform image processing of the demultiplexed image signal. To this end, the image processing unit 320 may include an image decoder 325 and a scaler 335.

The image decoder 325 may decode the demultiplexed image signal, and the scaler 335 may perform scaling so that the resolution of the decoded image signal can be output from the display 180.

The image decoder 325 may include decoders of various standards. For example, the image decoder 325 may include an MPEG-2, H.264 decoder, a 3D image decoder for color image and depth image, a decoder for multiple view images, and the like.

The processor 330 may control overall operation within the image display device 100 or within the controller 170. For example, the processor 330 may control the tuner 110 to select (tune) a broadcast corresponding to a channel selected by a user or a previously stored channel.

In addition, the processor 330 may control the image display device 100 according to a user command input through the user input interface unit 150 or an internal program.

In addition, the processor 330 may control data transmission with the network interface unit 135 or the external device interface unit 130.

Further, the processor 330 may control operation of the demultiplexer 310, the image processing unit 320, and the OSD generator 340 in the controller 170.

The OSD generator 340 may generate an OSD signal by itself or according to a user input. For example, the OSD generator 340 may generate a signal for displaying various types of information on the screen of the display 180 as a graphic or text, based on a user input signal input through the input unit 160.

The generated OSD signal may include various data such as a user interface screen, various menu screens, widgets, icons, and the like of the image display device 100. In addition, the generated OSD signal may include a 2D object or a 3D object.

In addition, the OSD generator 340 may generate a pointer that can be displayed on the display 180, based on a pointing signal input from the remote control device 200. The OSD generator 340 may include a pointing signal processing unit (not shown) that generates a pointer. The pointing signal processing unit (not shown) may not be provided in the OSD generator 340 and may be provided separately.

The mixer 345 may mix the OSD signal generated by the OSD generator 340 and the decoded image signal image-processed by the image processing unit 320. The mixed image signal may be provided to the frame rate converter 350.

The frame rate converter (FRC) 350 may convert a frame rate of an input image. Meanwhile, the frame rate converter 350 may output intactly without additional frame rate conversion.

The formatter 360 may arrange a left-eye image frame and a right-eye image frame of a frame rate-converted 3D image. In addition, the formatter 360 may output a synchronization signal Vsync for opening the left-eye glass and the right-eye glass of a 3D viewing device (not shown).

Meanwhile, the formatter 360 may convert the format of an input image signal into an image signal for display on the display 180 and output it.

In addition, the formatter 360 may change the format of the 3D image signal. For example, the formatter 360 may change the format of the 3D image signal into any one format among various 3D formats such as Side by Side format, Top/Down format, Frame Sequential format, Interlaced format, Checker Box format, and the like.

Meanwhile, the formatter 360 may convert a 2D image signal into a 3D image signal. For example, according to a 3D image generation algorithm, the formatter 360 may detect an edge or a selectable object in a 2D image signal, and separate and generate into a 3D image signal by the object according to the detected edge or the selectable object. At this time, the generated 3D image signal may be separated and arranged into a left-eye image signal L and a right-eye image signal R, as described above.

Meanwhile, although not shown in the drawing, after the formatter 360, a 3D processor (not shown) for processing a 3-dimensional (3D) effect signal may be further disposed. Such a 3D processor may process brightness, tint, and color adjustment of an image signal in order to improve a 3D effect. For example, it is possible to perform signal processing, or the like to make the near clear and the far blurry. Meanwhile, the functions of the 3D processor may be merged into the formatter 360 or within the image processing unit 320.

Meanwhile, an audio processing unit (not shown) in the controller 170 may perform audio processing of a demultiplexed audio signal. To this end, the audio processing unit (not shown) may include various decoders.

In addition, the audio processing unit (not shown) in the controller 170 may process a base, a treble, a volume control, and the like.

The data processing unit (not shown) in the controller 170 may perform data processing of the demultiplexed data signal. For example, when the demultiplexed data signal is an encoded data signal, it may be decoded. The encoded data signal may be electronic program guide information including broadcasting information such as a start time and an end time of a broadcast program aired on each channel.

Meanwhile, the block diagram of the controller 170 shown in FIG. 3 is just a block diagram for an embodiment of the present disclosure, and each component of the block diagram may be integrated, added, or omitted according to the specifications of the actually implemented controller 170.

In particular, the frame rate converter 350 and the formatter 360 are not provided in the controller 170, but may be separately provided respectively or may be provided separately as a single module.

Figure 4:
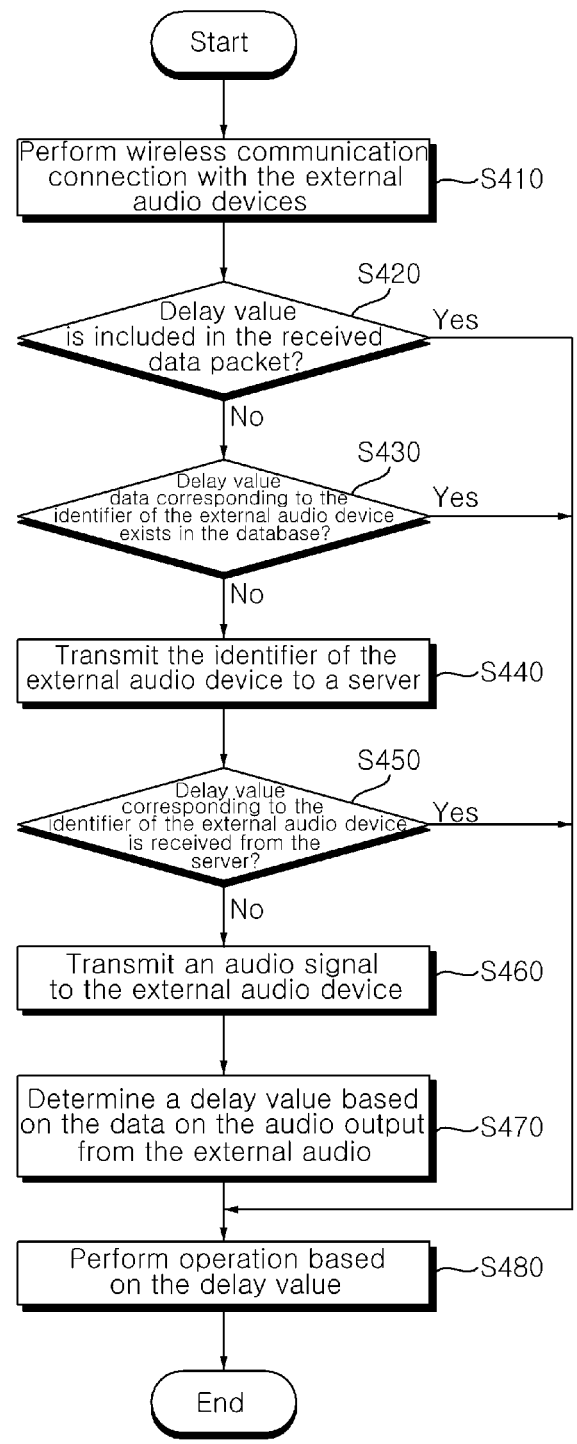
FIG. 4 is a flowchart illustrating a method of operating an image display apparatus according to an embodiment of the present disclosure.
Figure 5A:
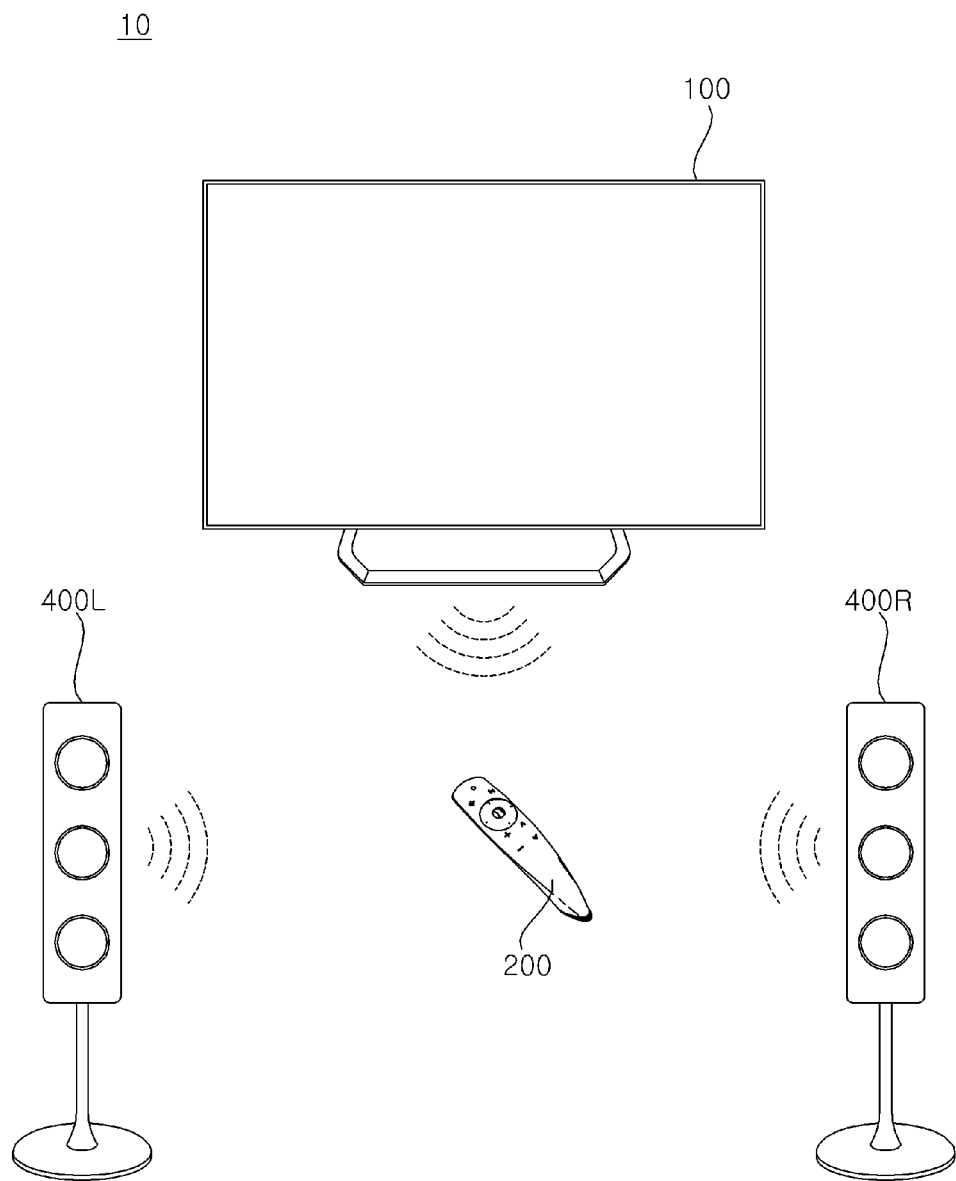
FIGS. 5A and 5B are diagrams referenced for explaining a method of operating an image display apparatus.
Figure 5B:
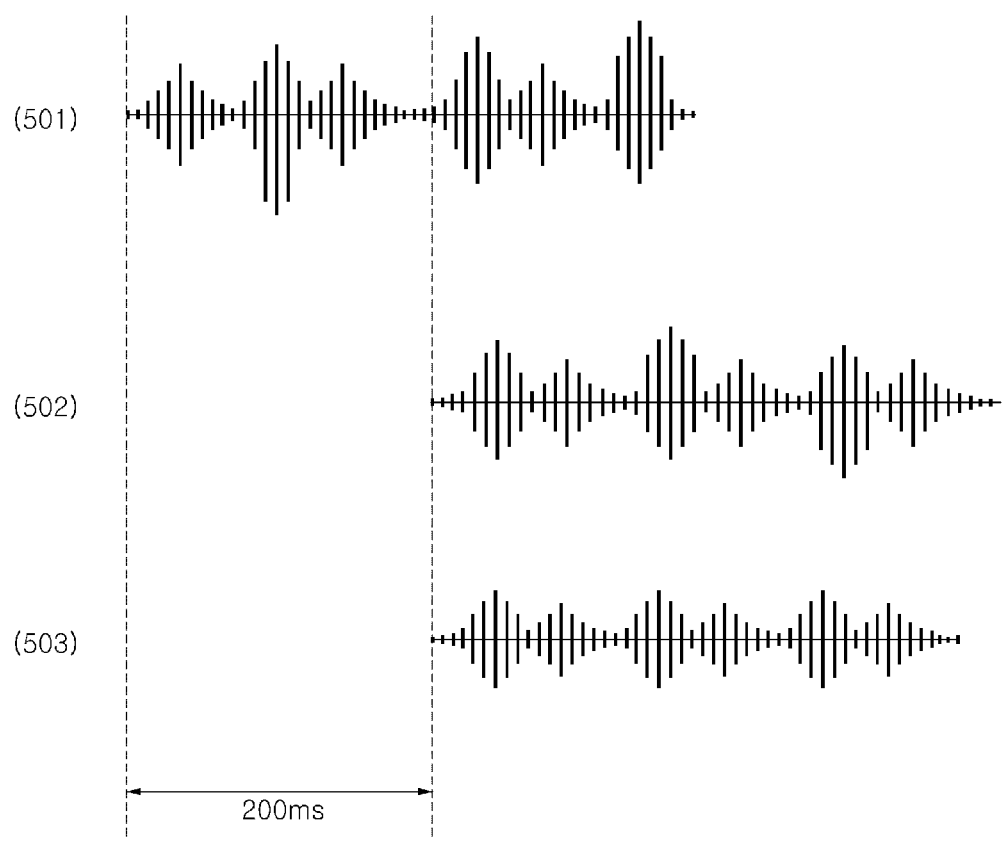

FIG. 4 is a flowchart illustrating a method of operating an image display apparatus according to an embodiment of the present disclosure. FIGS. 5A and 5B are diagrams referenced for explaining a method of operating an image display apparatus.

Referring to FIG. 4, at operation S410, the image display device 100 may perform wireless communication connection with the external audio devices 400L and 400R. For example, the image display device 100 may establish a mutual communication channel by performing Bluetooth pairing.

In this case, the image display device 100 may receive various data packets from the external audio devices 400L and 400R while performing Bluetooth pairing.

For example, the image display device 100 may receive an Extended Inquiry Response (EIR) packet including an identifier for the audio device 400L and 400R, a delay value for the delay of the audio output, and the like from the audio device 400L and 400R. Here, the identifier may be a device name of the audio device 400L and 400R, and the device name may be a model name of the audio device 400L and 400R, or a name arbitrarily set by a user.

At operation S420, the image display device 100 may determine whether a delay value for the delay of audio output is included in a data packet received from the external audio device 400L and 400R.

When the data packet received from the external audio devices 400L and 400R includes a delay value for the delay of the audio output, the image display device 100 branches to operation S480, and may perform operation based on the delay value included in the data packet.

The image display device 100 may determine a time point at which an image is output and/or a time point at which the audio is output, based on a delay value for the delay of audio output.

For example, when the delay value for the delay of the audio output is 200 ms, the image display device 100 may determine the difference between the time point at which the image/audio is output from the image display device 100 and the time point at which the audio is output from the external audio device 400L and 400R is 200 ms, due to the time required for transmission of the audio signal and the time required for processing the audio signal.

At this time, the image display device 100 may output an image corresponding to the audio signal transmitted to the external audio device 400L and 400R through the display 180, or may output audio through the audio output unit 185, at the time point when 200 ms is elapsed from the time point when the audio signal is transmitted to the external audio device 400L, 400R, based on the delay value for the delay of the audio output.

Meanwhile, the audio that is output from the image display device 100 in response to an audio signal transmitted to the external audio device 400L and 400R may be different from the audio output from the external audio device 400L and 400R.

For example, the image display device 100 may output a different audio based on a first audio data, the first external audio device 400L may output a different audio based on a second audio data, and the second external audio device 400R may output a different audio based on a third audio data, respectively. Through this, a user can enjoy a surround sound which allows various audios to be transmitted tridimensionally from various directions.

Meanwhile, at operation S430, when the data packet received from the external audio device 400L and 400R does not include a delay value for the delay of the audio output, the image display device 100 may determine whether a delay value corresponding to the identifier of the external audio device 400L and 400R included in the data packet is included in the database stored in the storage unit 140.

When the delay value corresponding to the identifier of the external audio device 400L, 400R is included in the database, the image display device 100 branches to operation S480, and may determine a time point at which an image is output and/or a time point at which an audio is output, based on the delay value included in the database.

Meanwhile, at operation S440, when the delay value corresponding to the identifier of the external audio device 400L and 400R is not included in the database, the image display device 100 may request transmission of a delay value corresponding to the identifier of the external audio device 400L and 400R, by transmitting the identifier of the external audio device 400L and 400R to a server.

The image display device 100 may determine whether a delay value corresponding to the identifier of the external audio device 400L and 400R is received from the server, at operation S450.

When the delay value corresponding to the identifier of the external audio device 400L and 400R is received from the server, the image display device 100 branches to operation S480, and may determine a time point at which the image is output and/or a time point at which the audio is output, based on the delay value received from the server.

Meanwhile, at operation S460, when the delay value corresponding to the identifier of the external audio device 400L and 400R is not received from the server, the image display device 100 transmits an audio signal to the external audio device 400L and 400R, so that the external audio devices 400L and 400R can be controlled to output an audio corresponding to the audio signal.

For example, the image display device 100 may transmit an audio signal including preset sample audio data to the external audio device 400L and 400R.

In this case, the image display device 100 may transmit a control signal including a command for performing an operation of receiving audio to the remote control device 200.

The image display device 100 may determine a delay value for the delay of the audio output of the external audio device 400L and 400R, based on the data on the audio output from the external audio device 400L and 400R, at operation S470. This will be described with reference to FIGS. 5A and 5B.

Referring to FIG. 5A, the remote control device 200 may receive audio output from the image display device 100 and audio output from the external audio device 400L and 400R.

For example, when a control signal including a command for performing an operation of receiving audio is received from the image display device 100, the remote control device 200 may receive audio from the outside through a microphone (not shown).

The remote control device 200 may transmit data on audio output from the image display device 100 and the external audio device 400L and 400R to the image display device 100.

At this time, the data transmitted from the remote control device 200 to the image display device 100 may include data on the waveform of audio output from the image display device 100 and the external audio device 400L and 400R.

Referring to FIG. 5B, the image display device 100 may check the waveform of audio output from the image display device 100 and the external audio device 400L and 400R, and may check a difference (e.g. 200 ms) between the time point at which audio is output from the image display device 100 and the time point at which audio is output from the external audio device 400L and 400R.

For example, the image display device 100 may compare preset sample audio data with data on the waveform of the audio received from the remote control device 200, extract the audio waveform 501 output from the image display device 100 and the audio waveform 502 and 503 output from the external audio device 400L and 400R, respectively, and may check a difference (e.g. 200 ms) between a time point at which audio is output from the image display device 100 and a time point at which audio is output from the external audio device 400L and 400R by comparing the extracted waveforms.

Meanwhile, the image display device 100 may transmit the delay value determined at operation S470, to the server. In this case, the image display device 100 may transmit the delay value determined at operation S470 and the identifier of the external audio device 400L and 400R together to the server.

Meanwhile, the image display device 100 may map the delay value determined at operation S470 to the identifier of the external audio device 400L and 400R, and add to the database.

Meanwhile, at operation S480, the image display device 100 may determine a time point at which image is output and/or a time point at which audio is output, based on the delay value determined at operation S470.

As described above, according to various embodiments of the present disclosure, according to a delay value included in the data packet, a delay value included in the database, a delay value received from the server, and/or a delay value determined based on the audio output from the external audio device 400L, 400R, the difference between the time point at which the image/audio is output from the image display device 100 and the time point at which the audio is output from the external audio device 400L and 400R, i.e., the delay of the audio output of the external audio device 400L and 400R may be adjusted and removed.

Figure 6A:
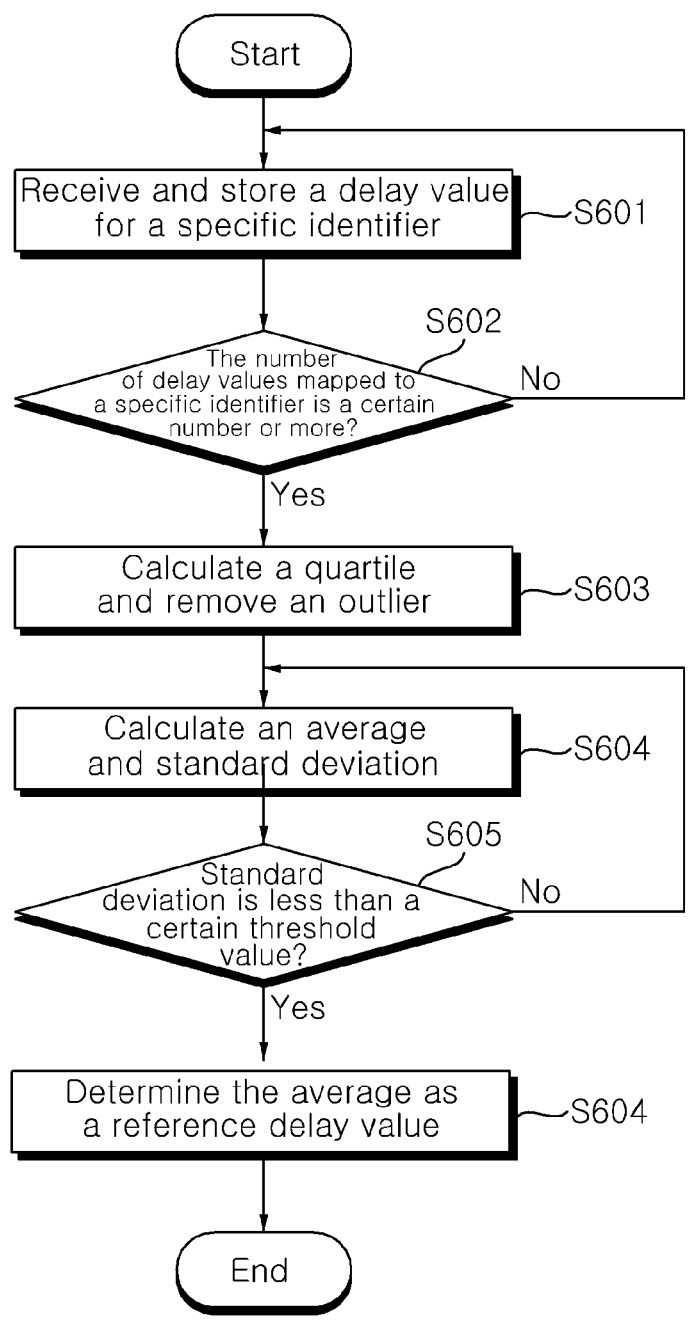
FIG. 6A is a flowchart illustrating a method of operating a server according to an embodiment of the present disclosure.
Figure 6B:
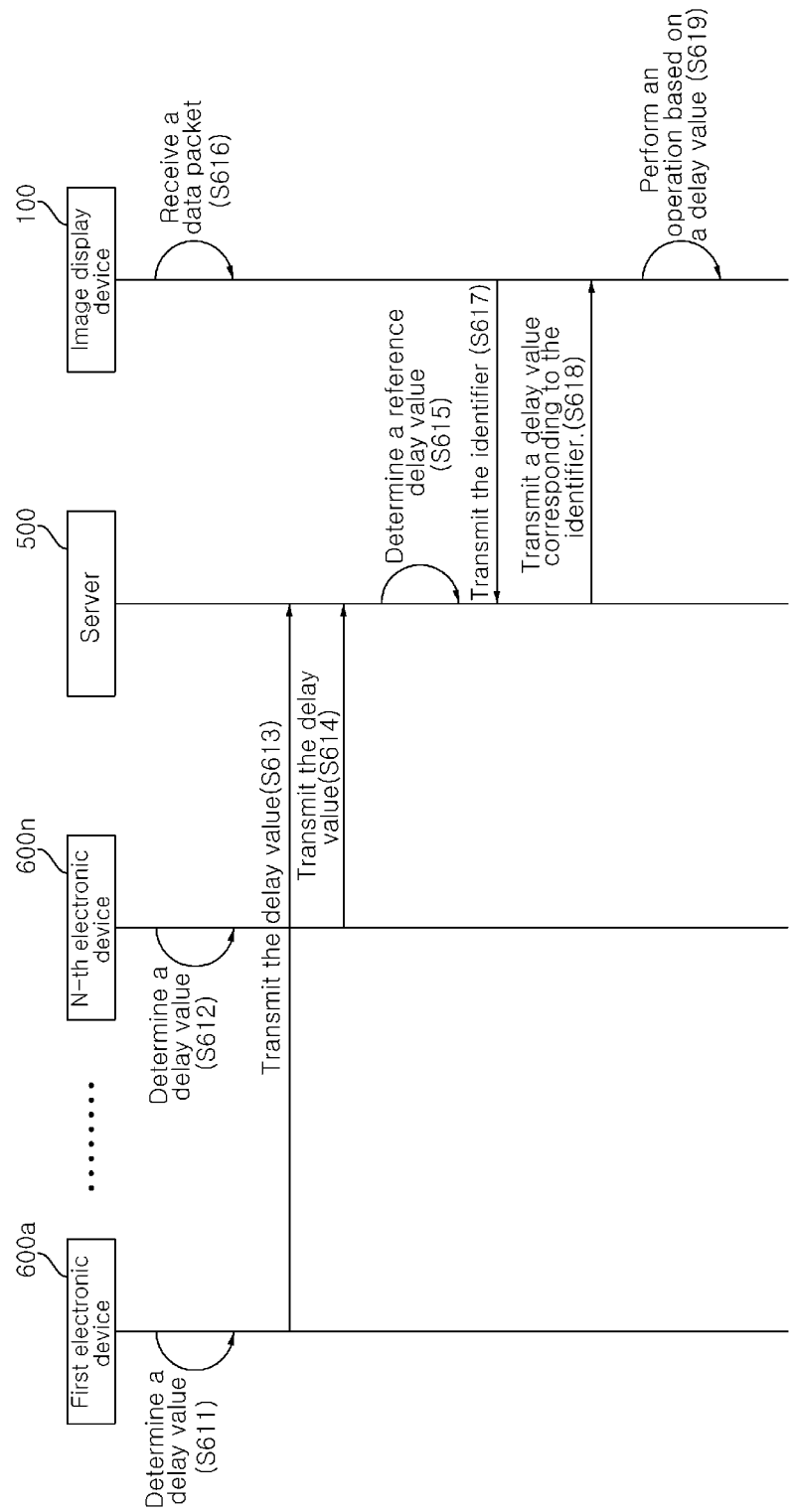
FIG. 6B is a flowchart illustrating a method of operating an image display system according to an embodiment of the present disclosure.

FIG. 6A is a flowchart illustrating a method of operating a server according to an embodiment of the present disclosure, and FIG. 6B is a flowchart illustrating a method of operating an image display system according to an embodiment of the present disclosure. Detailed descriptions of contents overlapping with those described in FIG. 4 will be omitted.

First, a server 500 includes at least one communication module, and may include a communication unit (not shown) for performing communication, a memory (not shown), and/or a server controller (not shown).

The memory may store a program for processing and controlling signals in the server controller.

For example, the memory may store application programs designed for the purpose of performing various tasks that can be processed by the server controller, and may selectively provide some of the stored application programs, upon request of the server controller.

The server controller may include at least one processor, and may control overall operation of the server 500 by using a processor included therein.

Referring to FIG. 6A, at operation S601, the server 500 may receive an identifier of an audio device (e.g. external audio device 400L, 400R) and a delay value for the delay of audio output, from at least one external device (e.g. the image display device 100), through the communication unit, and may store the received identifier and delay value of the audio device in a memory.

For example, the server 500 may map the received delay value to the identifier of the audio device and store it in the memory. In this case, when at least one delay value mapped to the identifier of the same audio device is previously stored in the memory, the server 500 may additionally map and store the received delay value to the previously stored identifier of the audio device.

The server 500 may check whether the number of a plurality of delay values that are mapped is greater than or equal to a certain number (e.g. 30), with respect to a specific identifier to which a plurality of delay values are mapped, among at least one identifier stored in the memory, at operation S602.

The server 500 may additionally map the delay value to a specific identifier until the number of the plurality of delay values mapped to the specific identifier is equal to or greater than a certain number (e.g. 30).

Meanwhile, at operation S603, the server 500 may calculate a quartile for a plurality of delay values, with respect to a specific identifier to which a plurality of delay values are mapped at least a certain number (e.g. 30), and may determine an outlier among a plurality of delay values based on the quartile.

Here, the quartile may mean a value obtained by quadrisecting a plurality of data values sorted according to magnitude, and an outlier may mean a data value deviated from a certain range for a plurality of data values.

For example, the server 500 may determine an outlier among a plurality of delay values, based on a quartile and a quartile range for the plurality of delay values.

The server 500 may calculate an average and standard deviation for the remaining delay value excluding the delay value determined as an outlier, at operation S604.

The server 500 may determine whether the calculated standard deviation is less than a certain threshold value (e.g. 5 ms), at operation S605.

When the calculated standard deviation is greater than or equal to a certain threshold value (e.g. 5 ms), the server 500 branches to operation S604, and may calculate an average and standard deviation excluding a delay value whose difference from the average is greater than or equal to the standard deviation, among the remaining delay values.

Meanwhile, when the standard deviation is less than a certain threshold value (e.g. 5 ms) at operation S606, the server 500 may determine the average calculated at operation S604 as a reference delay value for a specific identifier.

When receiving a request for transmission of a delay value corresponding to a specific identifier from the image display device 100, the server 500 may transmit a reference delay value determined for a specific identifier to the image display device 100.

Meanwhile, when the reference delay value corresponding to the specific identifier received from the image display device 100 is not determined, the server 500 may transmit a response signal indicating that there is no delay value corresponding to the specific identifier also to the image display device 100.

Referring to FIG. 6B, at operations S611 and S612, a first electronic device 600a to a n-th electronic device 600n may determine a delay value for the delay of audio output, based on data on the audio output from the external audio device communicatively connected to each device. In this case, the first electronic device 600a to the n-th electronic device 600n may be the same device as or similar to the image display device 100.

The first electronic device 600a to the n-th electronic device 600n may transmit the delay value determined by each device to the server 500 at operations S613 and S614, and the server 500 may store the delay value received from each device.

At this time, the first electronic device 600*a* to the n-th electronic device 600*n* may transmit the identifier of the external audio device communicatively connected to each device to the server 500 together with the delay value, and the server 500 may map and store the delay value to the identifier of the external audio device.

The server 500 may determine a reference delay value for a specific identifier in which a plurality of delay values are mapped at least a certain number (e.g. 30), at operation S615.

The image display device 100 may receive a data packet from the external audio device 400L and 400R, at operation S616.

In this drawing, the delay value is not included in the data packet received by the image display device 100, and it is illustrated that the delay value corresponding to the identifier of the external audio device 400L and 400R is not included in the database stored in the image display device 100.

The image display device 100 transmits the identifier of the external audio device 400L and 400R to the server 500 at operation S617 to request transmission of a delay value corresponding to the identifier of the external audio device 400L and 400R.

When the reference delay value for the identifier received from the image display device 100 is determined at operation S618, the server 500 may transmit the determined reference delay value to the image display device 100 as a delay value corresponding to the identifier of the external audio device 400L and 400R.

The image display device 100 may perform an operation based on a delay value received from the server 500, at operation S619. For example, the image display device 100 may determine a time point at which the image is output and/or a time point at which the audio is output, based on a delay value received from the server 500.

According to at least one embodiment of the present disclosure, a difference between a time point at which an image/audio is output from an image display apparatus and a time point at which audio is output from an external audio device, that is, a delay of an audio output from an external audio device, is effectively controlled, thereby providing a three-dimensional surround sound to a user.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display apparatus comprising:
    a display;
    a memory;
    an audio output unit;
    an external device interface unit having at least one communication module and performing short-range communication; and
    a controller configured to:
    receive a data packet from an external audio device through the external device interface unit,
    determine a time point at which image is output through the display, based on a delay value included in the data packet, when the data packet includes the delay value for a delay of audio output,
    determine whether the delay value corresponding to an identifier of the external audio device is included in a database for the delay value stored in the memory, when the delay value is not included in the data packet,
    determine the time point based on the delay value included in the database, when the delay value corresponding to the identifier of the external audio device is included in the database,
    transmit an audio signal to the external audio device through the external device interface unit, when the delay value corresponding to the identifier of the external audio device is not stored in the database,
    output audio corresponding to the audio signal through the audio output unit,
    receive data on audio output from the image display apparatus and audio output from the external audio device from a remote control device, through the external device interface unit,
    determine the delay value for the external audio device based on the data received from the remote control device, and
    determine the time point based on the delay value determined based on the data received from the remote control device.

2. The image display apparatus of claim 1, further comprising an audio output unit,
    wherein the controller is configured to determine a time point at which audio is output through the audio output unit, based on the delay value included in the data packet.

3. The image display apparatus of claim 1, further comprising a network interface unit for performing communication with a server,
    wherein the controller is configured to:
    transmit the identifier of the external audio device to the server through the network interface unit, when the delay value corresponding to the identifier of the external audio device is not included in the database,
    determine the time point based on the delay value received from the server, when the delay value corresponding to the identifier of the external audio device is received from the server, and
    transmit the audio signal to the external audio device through the external device interface unit, when the delay value corresponding to the identifier of the external audio device is not received from the server.

4. The image display apparatus of claim 1, wherein the controller is configured to determine a difference between a time point when the remote control device receives the audio output from the image display apparatus, and a time point when the remote control device receives the audio output from the external audio device, as the delay value.

5. The image display apparatus of claim 4, wherein the controller is configured to map the determined delay value for the external audio device to the identifier of the external audio device, and adds to the database.

6. The image display apparatus of claim 4, wherein the controller is configured to transmit the determined delay value for the external audio device to a server together with the identifier of the external audio device, through a network interface unit.

7. The image display apparatus of claim 1, wherein the data packet is an extended inquiry response (EIR) packet.

8. An image display system comprising an image display apparatus and an external audio device, wherein the external audio device is configured to transmit a data packet including an identifier to the image display apparatus, and the image display apparatus is configured to determine a time point at which an image is output through a display, based on a delay value included in the data packet, when the delay value for a delay of audio output is included in the data packet, determine whether the delay value corresponding to an identifier of the external audio device is included in a database for the delay value stored in a memory of the image display apparatus, when the delay value is not included in the data packet, determine the time point based on the delay value included in the database, when the delay value corresponding to the identifier of the external audio device is included in the database, transmit an audio signal to the external audio device through an external device interface unit of the image display apparatus, when the delay value corresponding to the identifier of the external audio device is not stored in the database, output audio corresponding to the audio signal through an audio output unit of the image display apparatus, receive data on audio output from the image display apparatus and audio output from the external audio device from a remote control device, through the external device interface unit of the image display apparatus, determine the delay value for the external audio device, based on the data received from the remote control device, and determine the time point based on the delay value determined based on the data received from the remote control device.

9. The image display system of claim 8, further comprising a server, wherein the image display apparatus is configured to:

transmit the identifier of the external audio device to the server, when the delay value corresponding to the identifier of the external audio device is not included in the database, wherein the server is configured to transmit the delay value corresponding to the identifier of the external audio device to the image display apparatus, when the server stores the delay value corresponding to the identifier of the external audio device.

* * * * *